(12) United States Patent
Kim et al.

(10) Patent No.: US 9,223,581 B2
(45) Date of Patent: Dec. 29, 2015

(54) DATA PROCESSING SYSTEM AND METHOD FOR SWITCHING BETWEEN HETEROGENEOUS ACCELERATORS

(75) Inventors: Boo-Jin Kim, Suwon-si (KR); Je Myoung Ko, Hwaseong-si (KR); Taek Kyun Shin, Gwangmyeong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 564 days.

(21) Appl. No.: 13/599,042

(22) Filed: Aug. 30, 2012

(65) Prior Publication Data

US 2013/0061033 A1    Mar. 7, 2013

(30) Foreign Application Priority Data

Aug. 30, 2011    (KR) .......................... 10-2011-0087411

(51) Int. Cl.
  *G06F 9/06*   (2006.01)
  *G06F 9/38*   (2006.01)
  *G06F 15/78*  (2006.01)

(52) U.S. Cl.
  CPC .......... *G06F 9/3877* (2013.01); *G06F 15/7842* (2013.01); *Y02B 60/1225* (2013.01)

(58) Field of Classification Search
  CPC .............. G06F 9/3877; G06F 15/7842; Y02B 60/1225
  See application file for complete search history.

(56) References Cited

U.S. PATENT DOCUMENTS

| | | | |
|---|---|---|---|
| 7,814,252 B2 * | 10/2010 | Hoshaku | 710/240 |
| 8,055,872 B2 * | 11/2011 | Biles et al. | 711/169 |
| 2006/0143615 A1 | 6/2006 | Kondo et al. | |
| 2009/0322764 A1 | 12/2009 | Saini et al. | |
| 2011/0249022 A1 * | 10/2011 | Poornachandran et al. | 345/619 |
| 2011/0307233 A1 * | 12/2011 | Tseng et al. | 703/14 |
| 2011/0307890 A1 * | 12/2011 | Achilles et al. | 718/100 |

FOREIGN PATENT DOCUMENTS

| | | |
|---|---|---|
| JP | 4367337 | 7/2006 |
| KR | 1020000032335 | 6/2000 |

* cited by examiner

*Primary Examiner* — Thuan Du
(74) *Attorney, Agent, or Firm* — F. Chau & Associates, LLC

(57) ABSTRACT

A method for operating a system on chip includes receiving an acceleration request signal generated upon execution of an application program, in response to receipt of the acceleration request signal, comparing a current usage of a central processing unit (CPU) with a threshold value to generate a comparison signal, and performing switching between heterogeneous accelerators to accelerate a function executed by the application program in response to the comparison signal.

18 Claims, 10 Drawing Sheets

FIG. 5

| Application Program | Default Accelerator | SI |
|---|---|---|
| APP1 | ACChw | 1 |
| APP2 | ACChw | 1 |
| APP3 | ACCsw | 0 |
| ... | ... | ... |
| APPn | ACCsw | 0 |

12-3

DATA PROCESSING SYSTEM AND METHOD FOR SWITCHING BETWEEN HETEROGENEOUS ACCELERATORS

CROSS-REFERENCE TO RELATED APPLICATIONS

This application claims priority under 35 U.S.C. §119(a) to Korean Patent Application No. 10-2011-0087411 filed on Aug. 30, 2011, the disclosure of which is incorporated by reference in its entirety herein.

TECHNICAL FIELD

Embodiments of the present inventive concept relate to technology for selecting an accelerator, and more particularly, to a system-on-chip for selecting between a hardware accelerator and a software accelerator and a method of operating the same.

DISCUSSION OF RELATED ART

Data processing systems which support multimedia including graphics, audio, video, animation, games and text include various types of accelerators such as an audio codec, a video codec, a two-dimensional (2D) accelerator and/or a three-dimensional (3D) accelerator.

These accelerators may be implemented in hardware or software. A hardware accelerator uses dedicated hardware or a dedicated hardware device to perform some functions faster than a central processing unit (CPU). In other words, the hardware accelerator can accelerate the processing of certain functions to high speeds without increasing the load on the CPU. However, the hardware accelerator needs separate hardware, which increases manufacturing cost.

A software accelerator can accelerate the processing of functions with low power consumption and without requiring separate hardware. However, the software accelerator may reduce the operating speed or the response speed of a data processing system operating with a large load.

SUMMARY

According to an exemplary embodiment of the present inventive concept, a method for operating a system-on-chip includes receiving an acceleration request signal generated upon execution of an application program, in response to receipt of the acceleration request signal, comparing a current usage of a central processing unit (CPU) with a threshold value to generate a comparison signal, and performing switching between heterogeneous accelerators to accelerate multimedia function executed by the application program in response to the comparison signal.

The heterogeneous accelerators may include a hardware accelerator implemented as a hardware device and a software accelerator implemented as a program code configured to be executed by the CPU, and the software accelerator may be loaded from a memory to the CPU and then executed.

The comparing and generating may occur when a default accelerator for the application program is the hardware accelerator and the hardware accelerator is currently operating.

Alternatively, the comparing may occur when the default accelerator for the application program is the software accelerator.

The current usage may be an idle time of the CPU.

Alternatively, the current usage may be one of an operating voltage of the CPU and an operating frequency of the CPU.

According to an exemplary embodiment of the present inventive concept, a method for operating a system-on-chip includes receiving an acceleration request signal generated upon execution of an application program, determining whether a default accelerator for accelerating a function executed by the application program is a hardware accelerator or a software accelerator implemented as a program executable by a CPU in response to the acceleration request signal, comparing a current usage of the CPU with a threshold value to generate a comparison signal when it is determined that the default accelerator is the software accelerator or is the hardware accelerator that is currently accelerating a different function, and switching the default accelerator with a non-default accelerator based on the comparison signal.

The determining may be performed based on accelerator information stored in a table.

According to an exemplary embodiment of the present inventive concept, a system-on-chip includes heterogeneous accelerators and a CPU configured to execute an accelerator controller module which generates a comparison signal for switching between the heterogeneous accelerators for acceleration of a function executed by an application program.

The accelerator controller module may compare a current usage of the CPU with a threshold value to output the comparison signal. The heterogeneous accelerators may include a hardware accelerator implemented as a hardware device and a software accelerator implemented as computer program code that is configured to be executed by the CPU. The software accelerator may be loaded from a memory to the CPU and then executed.

When the hardware accelerator is set as a default accelerator for accelerating the function and is accelerating a different function, the accelerator controller module may switch the hardware accelerator with the software accelerator to accelerate the function based on the comparison signal generated when an idle time of the CPU that corresponds to the current usage is greater than the threshold value.

When the software accelerator is set as the default accelerator for accelerating the function, the accelerator controller module may switch the software accelerator with the hardware accelerator to accelerate the function based on the comparison signal generated when the idle time of the CPU that corresponds to the current usage is less than the threshold value.

Alternatively, when the hardware accelerator is set as the default accelerator for accelerating the function and is currently accelerating a different function, the accelerator controller module may switch the hardware accelerator with the software accelerator to accelerate the function based on the comparison signal generated when an operating frequency of the CPU that corresponds to the current usage is lower than the threshold value.

Alternatively, when the software accelerator is set as the default accelerator for accelerating the function, the accelerator controller module may switch the software accelerator with the hardware accelerator to accelerate the function based on the comparison signal generated when an operating frequency of the CPU that corresponds to the current usage is higher than the threshold value.

The current usage may be an idle time of the CPU or may be at one of an operating voltage of the CPU and an operating frequency of the CPU.

According to an exemplary embodiment of the present inventive concept, a portable device includes a non-volatile memory configured to store multimedia data, a display, heterogeneous accelerators, and a CPU configured to execute an accelerator controller module which generates a comparison signal for switching between the heterogeneous accelerators for acceleration of processing the multimedia executed by an application program.

The accelerator controller module may compare a current usage of the CPU with a threshold value to output the comparison signal. The selected accelerator displays accelerated multimedia data through the display. The heterogeneous accelerators may include a hardware accelerator implemented as a hardware device and a software accelerator implemented as computer program code that can be executed in the CPU. The software accelerator may be loaded from a memory to the CPU and then executed.

According to an exemplary embodiment of the present inventive concept, a system-on-chip includes a hardware accelerator, a memory configured to store an application program, an accelerator controller module and a software accelerator, and a CPU configured to control the hardware accelerator and the memory and execute the application program, the accelerator control module, and the software accelerator. Upon receipt by the accelerator controller module of an acceleration request signal generated by the application program, the accelerator controller module determines whether a default accelerator for accelerating a function executed by the application program is the hardware accelerator or the software accelerator. The accelerator controller module compares a current usage of the CPU with a threshold value to generate a comparison signal when it is determined that the default accelerator is the software accelerator or is the hardware accelerator that is currently accelerating different function, and switch the default accelerator with a non-default accelerator according to the comparison signal.

The accelerator controller module may determine the default accelerator based on accelerator information about the default accelerator.

The accelerator controller module may adjust the threshold value based on information input from a user input interface.

According to an exemplary embodiment of the present inventive concept, a method for operating a system-on-chip includes receiving, at an accelerator controller module, an acceleration request signal generated upon execution of an application program, reading, at the accelerator controller module, accelerator information from a table in response to the acceleration request signal, and selectively driving, by the accelerator controller module, one of a hardware accelerator implemented as a hardware device or a software accelerator implemented as a computer program code to accelerate a function executed by the application program, based on the accelerator information. The accelerator information indicates which among the hardware accelerator and the software accelerator has a shorter acceleration time.

According to an exemplary embodiment of the present inventive concept, a method for operating a system-on-chip includes receiving a change signal, determining whether the change signal is an instruction to select a default accelerator selected based on power consumption or an instruction to select a default accelerator selected based on performance, referring to accelerator information stored in a table based on a result of the determination, and driving one of a hardware accelerator or a software accelerator that is set as the default accelerator based on the accelerator information, the hardware accelerator implemented as a hardware device, and the software accelerator implemented as computer program code executable by a CPU.

The method may further include when the change signal is an instruction to select the default accelerator selected based on the power consumption, comparing a current usage of the CPU with a threshold value to generate a comparison signal, and switching the default accelerator with a non-default accelerator based on the comparison signal.

A system-on-chip (SOC) according to an exemplary embodiment of the inventive concept includes a bus, a CPU interfaced with the bus, a hardware accelerator interfaced with the bus and configured to accelerate a function using hardware, and a memory interfaced with the bus. The memory includes a software accelerator and the accelerator control module. The software accelerator is configured to accelerate the same function using software. The accelerator control module is configured to select one of the hardware accelerator and the software accelerator to accelerate the function for an application program in response to a request for acceleration by the application program. The accelerator control module selects the hardware accelerator if a default parameter within the SOC is set to the hardware accelerator and the hardware accelerator is not currently operating, and other selects one of the hardware accelerator and software accelerator based on a comparison of a usage parameter of the CPU with a threshold value.

In an embodiment, the usage parameter is an amount of time the CPU is idle. In this embodiment, the accelerator control module selects the hardware accelerator when the amount is less than the threshold value and selects the software accelerator otherwise.

In an embodiment, the usage parameter is an operating frequency of the CPU. In this embodiment, the accelerator control module selects the hardware accelerator when the operating frequency is greater than the threshold value and selects the software accelerator otherwise.

In an embodiment, the usage parameter is an operating voltage of the CPU. In this embodiment, the accelerator control module selects the hardware accelerator when the operating voltage is greater than the threshold value and selects the software accelerator otherwise.

BRIEF DESCRIPTION OF THE DRAWINGS

Embodiments of the present inventive concept will become more apparent by describing in detail exemplary embodiments thereof with reference to the attached drawings in which:

FIG. 5 shows an example of a table including selection information of a default accelerator that is set for an application program according to the method illustrated in FIG. 4;

DETAILED DESCRIPTION

Figure 1:
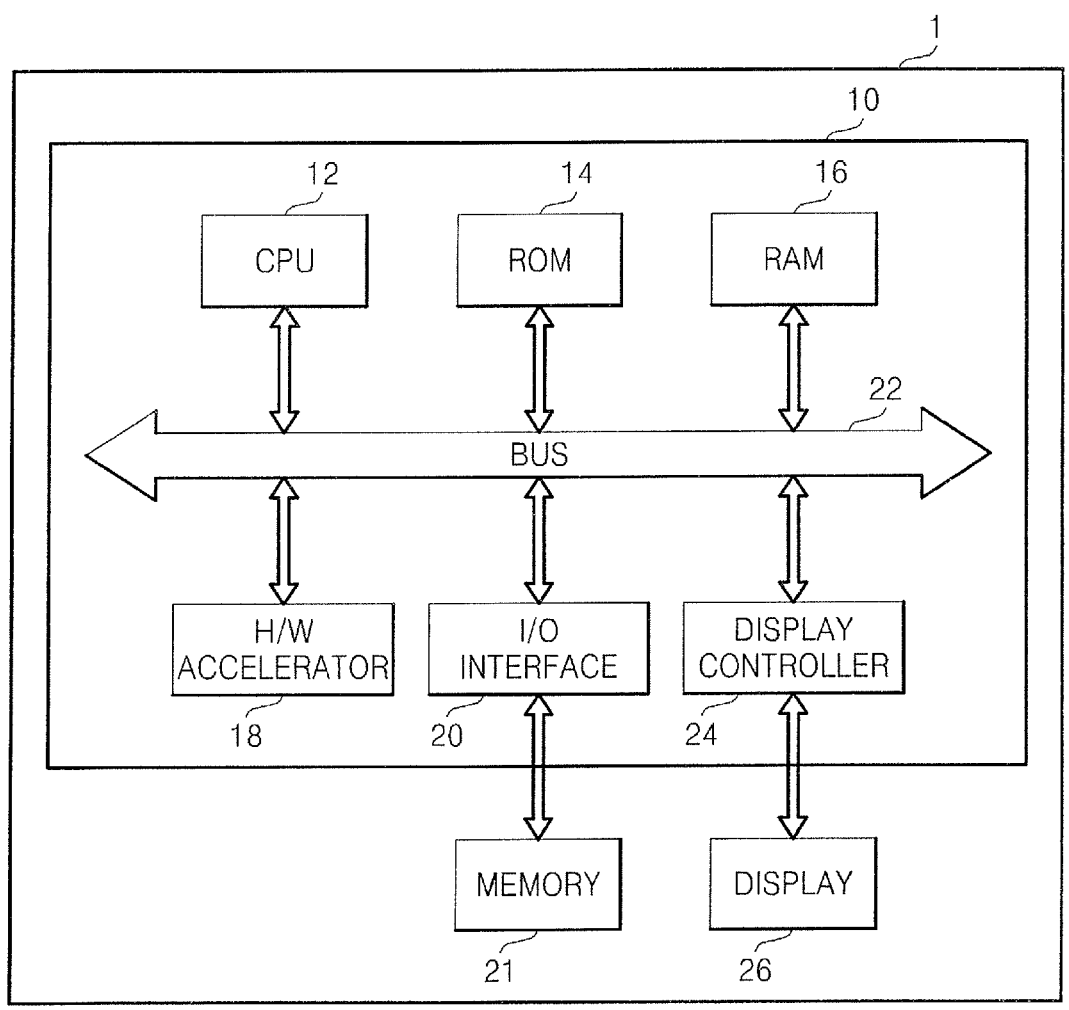
FIG. 1 is a block diagram of a data processing system according to an exemplary embodiment of the present inventive concept.

The present inventive concept now will be described more fully hereinafter with reference to the accompanying drawings, in which exemplary embodiments of the inventive concept are shown. This inventive concept may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

An accelerator used herein may be any of the accelerators described below.

In at least one embodiment of the inventive concept, a video codec that can be implemented as a hardware accelerator or software accelerator indicates a device or software that can compress and/or decompress digital video.

In at least one embodiment of the inventive concept, an audio codec that can be implemented as a software accelerator indicates a computer program that realizes an algorithm for compressing and/or decompressing digital audio data in accordance with a given audio file format or streaming audio format.

In at least one embodiment of the inventive concept, an audio codec that can be implemented as a hardware accelerator indicates a device that can encode analog audio into digital signals and decode digital signals into analog audio.

In at least one embodiment of the inventive concept, a download accelerator or download manager that can be implemented as a software accelerator indicates dedicated software for downloading.

In at least one embodiment of the inventive concept, a graphics processing unit or graphics accelerator that can be implemented as a hardware accelerator indicates a dedicated graphics rendering device. In at least one embodiment of the inventive concept, an accelerator or a library that can be implemented as a software accelerator indicates a library for storing function or programs for the graphics processing unit.

In at least one embodiment of the inventive concept, a cryptographic accelerator that can be implemented as a hardware accelerator or software accelerator indicates a device or software that can perform encrypting and/or decrypting. In at least one embodiment of the inventive concept, a web accelerator that can be implemented as a hardware accelerator indicates a proxy server that can access websites quickly.

An MP3 player or an MP4 player can be implemented in hardware or software. A two-dimensional (2D) accelerator or a three-dimensional (3D) accelerator can also be implemented in hardware or software.

Apart from the above-described accelerators, accelerators that can accelerate processing of or the display of multimedia data can be implemented in hardware or software. In addition, examples of an accelerator may also include an audio encoder, an audio decoder, a video encoder, and a video decoder.

In at least one embodiment of the inventive concept, a data processing system includes heterogeneous accelerators, e.g., at least one hardware accelerator and at least one software accelerator, and switches between the heterogeneous accelerators based on a comparison signal that indicates a result of comparing a current usage of a CPU with a reference usage (e.g., a threshold value). For example, if a software accelerator is currently being used for encrypting data, the system can switch to using a hardware accelerator for the encrypting based on how the current usage compares the threshold value.

FIG. 1 is a block diagram of a data processing system 1 according to exemplary embodiment of the present inventive concept. The data processing system 1 may be a cellular phone, a smart phone, a tablet personal computer, a personal digital assistant (PDA), an enterprise digital assistant (EDA), a digital still camera, a digital video camera, a portable multimedia player (PMP), a personal navigation device or portable navigation device (PND), a handheld game console, a handheld device such as an e-book, a personal computer, etc.

The data processing system 1 includes a system-on-chip (SoC) 10, a memory 21, and a display 26. The SoC 10, the memory 21 and the display 26 may be implemented in or on a system printed circuit board (PCB).

The SoC 10 includes a CPU 12, a read-only memory (ROM) 14, a random access memory 16, a hardware accelerator 18, an input/output (I/O) interface 20, a bus 22 and a display controller 24.

The CPU 12 that may be referred to as a processor and may process or execute programs and/or data stored in the ROM 14 or the RAM 16. The CPU 12 may process or execute the programs and/or data in response to a clock signal output from a clock signal generator (not shown).

The CPU 12 may be implemented as a multi-core processor. The multi-core processor is a single computing component that substantially includes two or more independent processors (referred to as cores) each of which can read and execute program instructions. The multi-core processor can drive a plurality of accelerators at a time. Accordingly, a data processing system including the multi-core processor can perform multi-acceleration.

The programs and/or data stored in the ROM 14 or the RAM 16 may be loaded to a memory, e.g., a cache memory, of the CPU 12.

The ROM 14 may store permanent programs and/data. The ROM 14 may be implemented by an erasable programmable ROM (EPROM) or electrically erasable programmable ROM (EEPROM).

The RAM 16 may temporarily store programs, data or instructions. For instance, programs and/or data stored in the memory 14 or 21 may be temporarily stored in the RAM 16 under the control of the CPU 12 or a booting code stored in the ROM 14. The RAM 16 may be implemented by dynamic RAM (DRAM) or static RAM (SRAM).

The hardware accelerator 18 may be a hardware device or a co-processor that can improve the performance of processing multimedia (or multimedia data) such as text, audio, still images, animation, video, 2D data or 3D data.

For clarity of the description, only one hardware accelerator 18 is illustrated in FIG. 1, but the SoC 10 may include one or more hardware accelerators. For example, when multiple hardware accelerators are available, each application program can make use of its own hardware accelerator, or several.

The SoC 10 and the memory 21 communicate data with each other through the I/O interface 20. The memory 21 may store programs, functions, and/or multimedia data to be processed by the CPU 12. The memory 21 may be implemented by a non-volatile memory. The non-volatile memory may be a flash memory or a resistive memory. In an embodiment, the I/O interface 20 is implemented as a memory controller. The elements 12, 14, 16, 18, 20 and 24 of the SoC 10 may communicate with one another through a bus 22.

The display controller 24 may control the operation of the display 26 and may display multimedia data that have been accelerated (or processed) by a software accelerator loaded to CPU 12 or the hardware accelerator 18.

Figure 2:
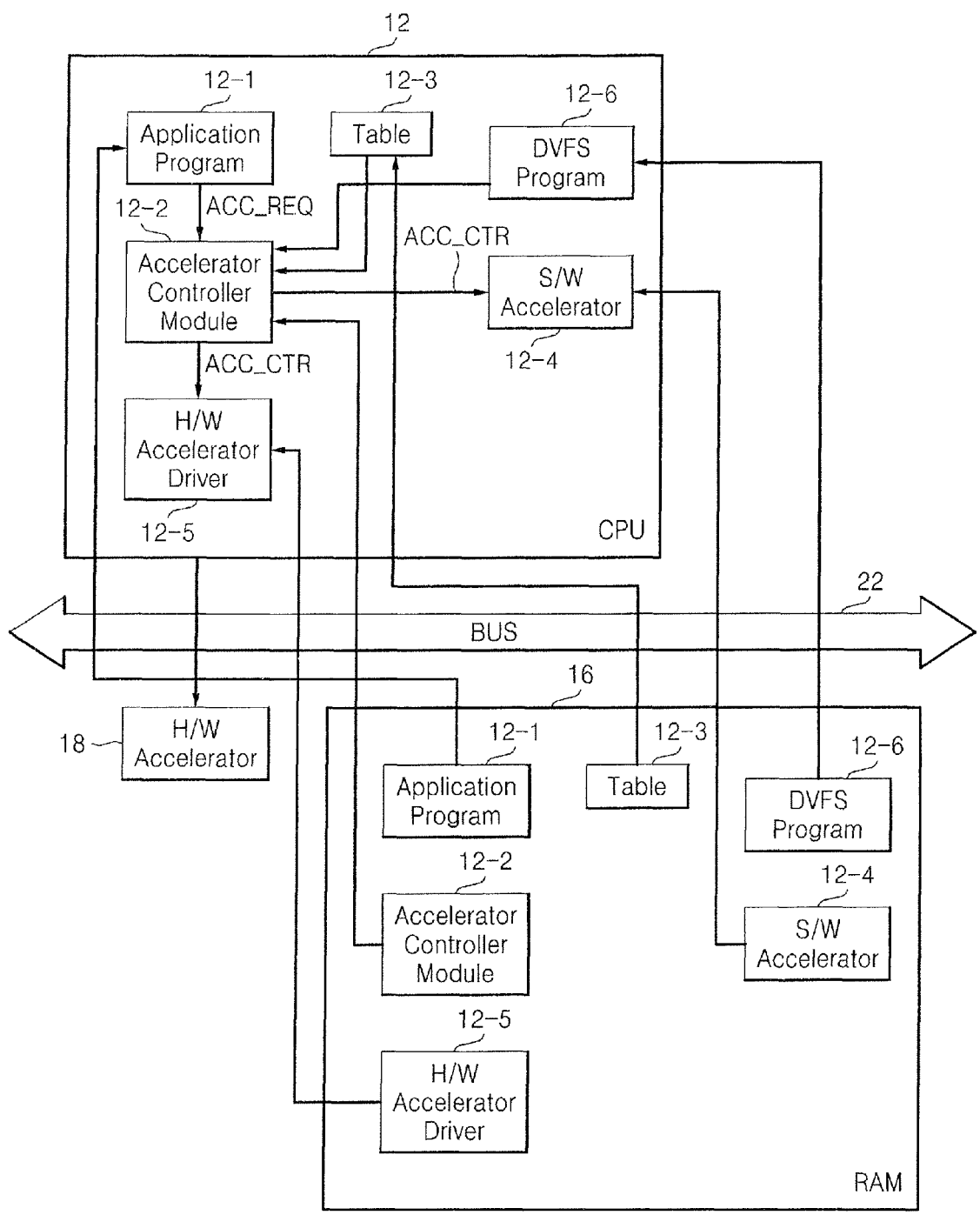
FIG. 2 is a block diagram for explaining the operations of the data processing system illustrated in FIG. 1.
Figure 3:
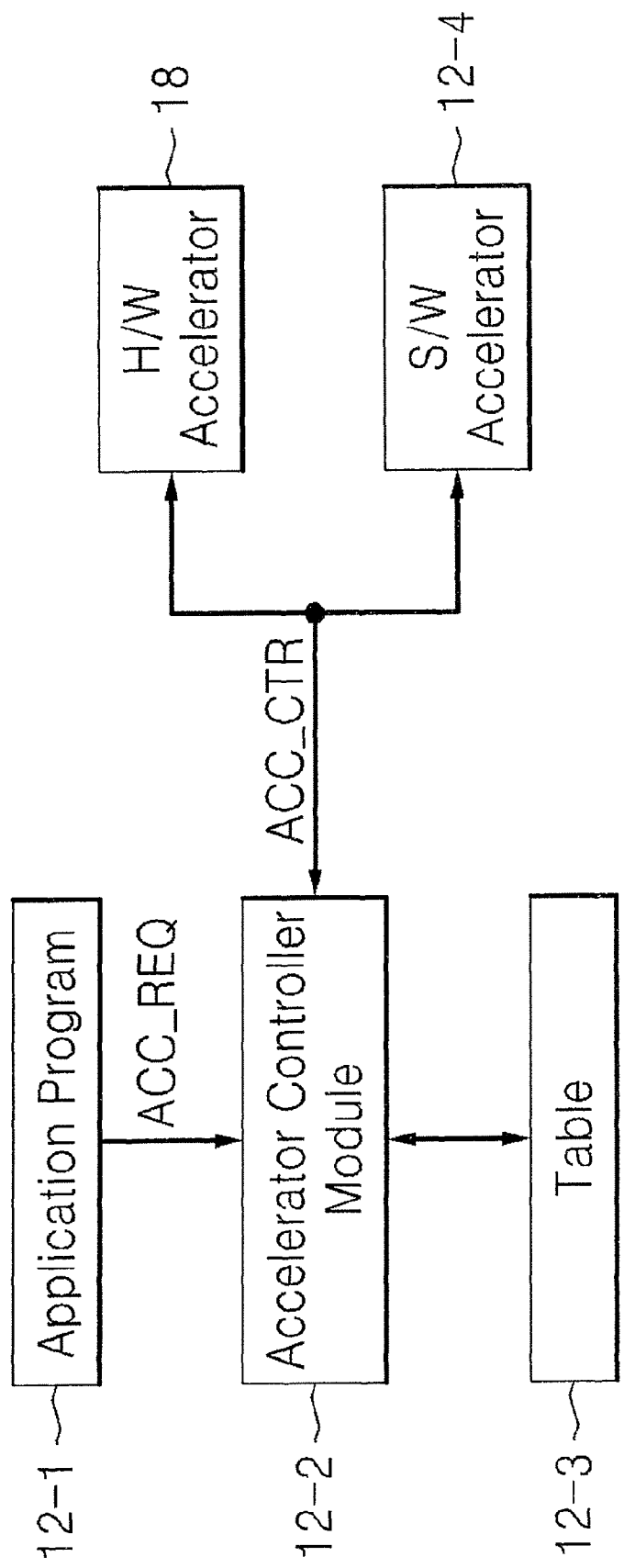
FIG. 3 is a conceptual diagram for explaining the switching between a hardware accelerator and a software accelerator according to an exemplary embodiment of the present inventive concept.

FIG. 2 is a block diagram for explaining the operations of the data processing system 1 illustrated in FIG. 1. FIG. 3 is a conceptual diagram for explaining the switching between a hardware accelerator and a software accelerator according to exemplary embodiment of the present inventive concept. Referring to FIGS. 1 through 3, an operating system (OS) of the CPU 12 controls the overall operation of the CPU 12. For instance, when an application program (or a multimedia player) 12-1 is loaded to a memory of the CPU 12 and then executed, the application program 12-1 generates an acceleration request signal ACC_REQ. In at least one embodiment, when the application program 12-1 is executed or selected by a user, the application program 12-1 is loaded to the RAM 16 and then loaded to the memory of the CPU 12.

Programs 12-1 through 12-6 may be loaded from the memory 14 or 21 to the RAM 16. An accelerator controller module (or accelerator control code) 12-2 that has been loaded to the RAM 16 is loaded to the memory of the CPU 12 through the bus 22. A table 12-3 that has been loaded to the RAM 16 is loaded to the memory of the CPU 12.

In response to the acceleration request signal ACC_REQ, the accelerator controller module 12-2 determines whether a default accelerator set as default to accelerate a function (e.g., a function to process multimedia data, encrypt data, decrypt data, render graphics, speed up web-browsing, etc.) executed by the application program 12-1 is the hardware accelerator implemented by a hardware device or a software accelerator implemented as a computer program executable by the CPU 12. In an embodiment, the accelerator controller module 12-2 determines the default accelerator with reference to accelerator information stored in the table 12-3.

For instance, when the default accelerator set for the application program 12-1 is the hardware accelerator 18, a hardware accelerator driver 12-5 that has been loaded to the RAM 16 is loaded to the CPU 12 based on a control (or control signal) ACC_CTR of the accelerator controller module 12-2. The hardware accelerator 18 operates according to the control of the hardware accelerator driver 12-5. Accordingly, the hardware accelerator 18 accelerates the function requested (or executed) by the application program 12-1 and transmits the accelerated data (e.g., accelerated multimedia data) to the display 26 through the display controller 24.

However, when the default accelerator for the application program 12-1 is the software accelerator, a software accelerator 12-4 that has been loaded to the RAM 16 is loaded to the CPU 12 based on a control ACC_CTR of the accelerator controller module 12-2. The software accelerator 12-4 loaded to the CPU 12 is executed or driven based on a control (or control signal) ACC_CTR of the accelerator controller module 12-2. Accordingly, the software accelerator 12-4 accelerates the function requested (or executed) by the application program 12-1 and transmits the accelerated data to the display 26 through the display controller 24.

Figure 4:
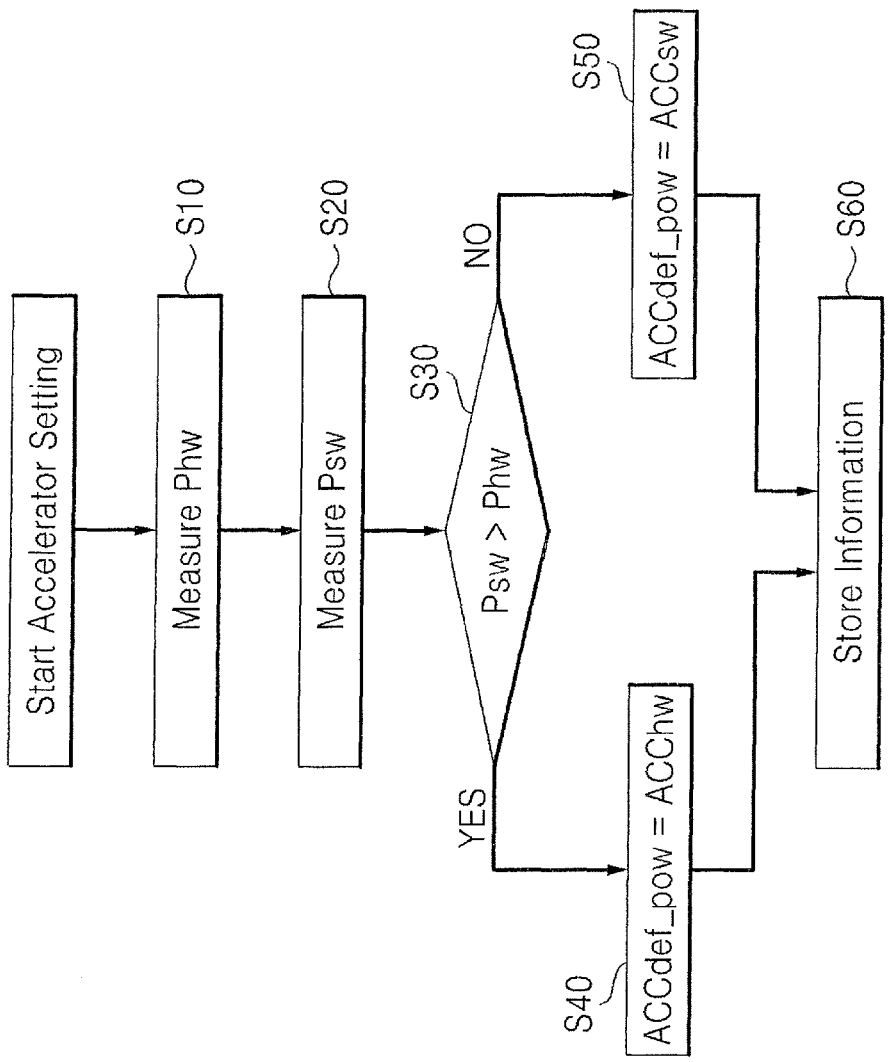
FIG. 4 is a flowchart of a method of selecting a default accelerator for an application program based on power consumption according to an exemplary embodiment of the present inventive concept.

FIG. 4 is a flowchart of a method of selecting a default accelerator for an application program based on power consumption according to an exemplary embodiment of the present inventive concept. FIG. 5 shows an example of the table 12-3 including selection information of a default accelerator that is set for an application program according to the method illustrated in FIG. 4.

Referring to FIGS. 4 and 5, when accelerator setting starts, the accelerator controller module 12-2 loaded to the CPU 12 measures (or estimates) power Phw consumed when a hardware accelerator allocated for a first application program APP1 is executed in operation S10. The accelerator controller module 12-2 also measures (or estimates) power Psw consumed when a software accelerator allocated for the first application program APP1 is executed in operation S20. In the embodiment illustrated in FIG. 4, operation S10 is performed before operation S20, but operation S20 may be performed prior to operation S10 in other embodiments.

The power consumption of a hardware accelerator may be determined from power consumption parameters of the hardware used in the hardware accelerator and the amount of time the hardware accelerator is run. For example, if one type of hardware accelerator uses 1 watt per second, and typically runs 1 second when accelerating the first application program APP1, 1 watt would be the estimated power consumption Phw. In another embodiment, the computer system in which the accelerator is run includes a sensor that detects an amount of power consumed by the computer system during a given period of time. For example, if 1 watt of power is consumed during a 1 second period without an accelerator running, and a subsequent 1 second period consumes 1.5 watt with the accelerator running, it can be inferred that the accelerator is responsible for 0.5 watts of power consumption. The accelerator controller module 12-2 may be configured to access data recorded by the sensor to estimate the power consumption. However, embodiments of the inventive concept are not limited any particular method of calculating power consumption.

The accelerator controller module 12-2 compares the power consumption Phw of the hardware accelerator allocated for the first application program APP1 with the power consumption Psw of the software accelerator allocated for the first application program APP1 in operation S30. For instance, when the power consumption Psw of the software accelerator is greater than the power consumption Phw of the hardware accelerator in operation S30, the accelerator controller module 12-2 selects the hardware accelerator, i.e., ACChw for the first application program APP1 as the default accelerator, i.e., ACCdef_pow in operation S40.

However, when the power consumption Psw of the software accelerator is not greater than the power consumption Phw of the hardware accelerator in operation S30, the accelerator controller module 12-2 selects the software accelerator, i.e., ACCsw for the first application program APP1 as the default accelerator ACCdef_pow in operation S50.

In other words, the accelerator controller module 12-2 selects an accelerator that consumes less power between the software accelerator and the hardware accelerator as the default accelerator for the first application program APP1.

The accelerator controller module 12-2 stores in the table 12-3 information SI about the accelerator selected in operation S40 or S50 in operation S60.

When the SoC 10 illustrated in FIG. 1 includes "n" application programs (where "n" is a natural number), "n" hardware accelerators and "n" software accelerators, as described with reference to FIG. 4 the accelerator controller module 12-2 may select a default accelerator for each of the "n"

application programs based on power consumption and store the information SI about the selected accelerator in the table 12-3.

As illustrated in FIG. 5, the accelerator controller module 12-2 selects the hardware accelerator ACChw as the default accelerator for the first application program APP1 and stores the accelerator information SI, e.g., 1, in the table 12-3.

The accelerator controller module 12-2 selects the hardware accelerator ACChw as a default accelerator for a second application program APP2 and stores accelerator information SI, e.g., 1, in the table 12-3. The accelerator controller module 12-2 selects the software accelerator ACCsw as a default accelerator for a third application program APP3 and stores accelerator information SI, e.g., 0, in the table 12-3. The accelerator controller module 12-2 selects the software accelerator ACCsw as a default accelerator for an n-th application program APPn and stores accelerator information SI, e.g., 0, in the table 12-3.

The table 12-3 including the accelerator information SI may be stored in the ROM 14 or the memory 21. The table 12-3 stored in the ROM 14 or the memory 21 may be loaded to the RAM 16 every time when the SoC 10 is booted or a particular application program is executed and then loaded to the memory of the CPU 12, so that the table 12-3 can be referred to by the accelerator controller module 12-2.

Figure 6:
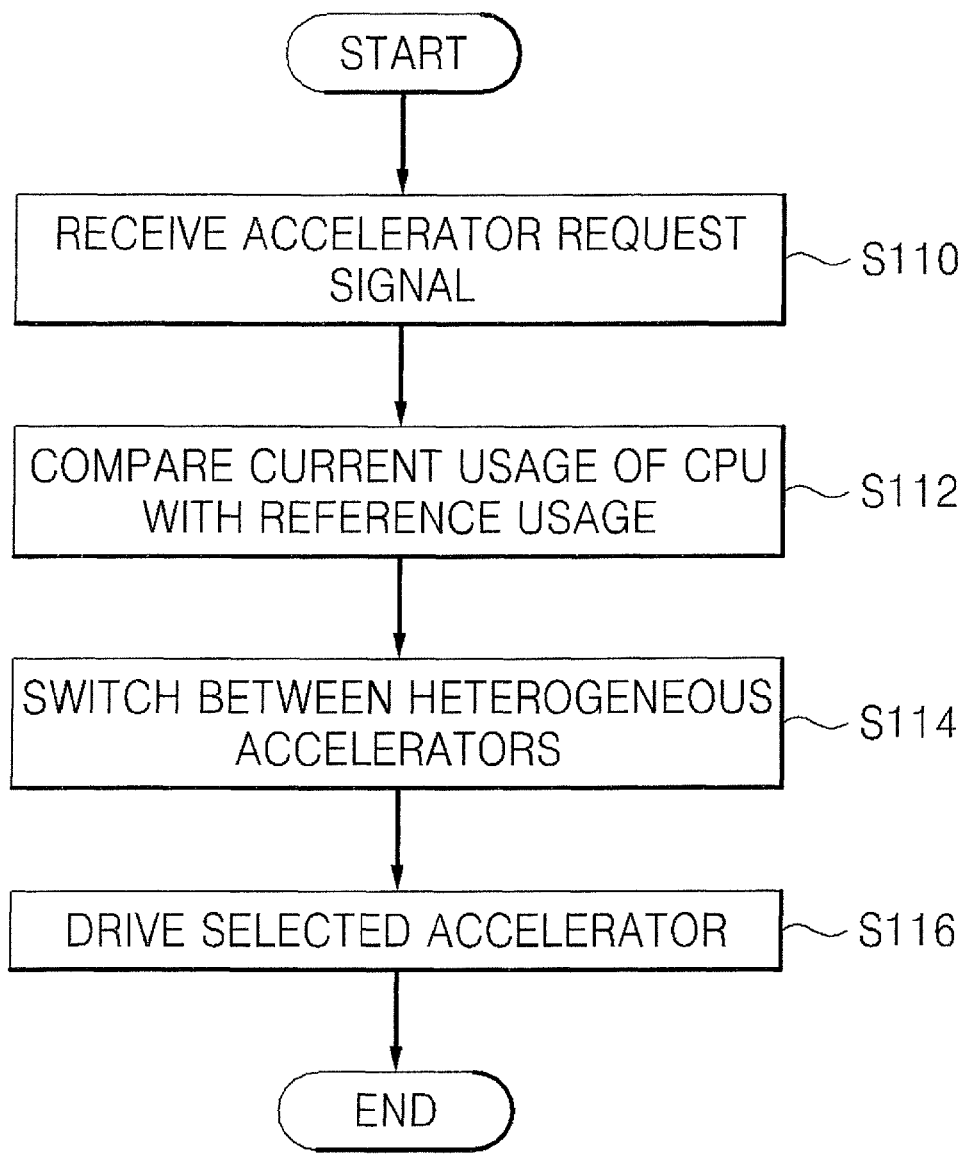
FIG. 6 is a flowchart of an operation method of the data processing system illustrated in FIG. 1 according to an exemplary embodiment of the present inventive concept.

FIG. 6 is a flowchart of an operation method of the data processing system 1 illustrated in FIG. 1 according to an exemplary embodiment of the present inventive concept. The operation method illustrated in FIG. 6 relates to switching a default accelerator with a non-default accelerator based on the performance of each accelerator in a state where either a hardware accelerator or a software accelerator has been set as a default accelerator based on power consumption.

Referring to FIGS. 1, 2, 5 and 6, when the first application program APP1 (i.e., 12-1) is executed, the accelerator controller module 12-2 receives the acceleration request signal ACC_REQ generated by the first application program 12-1 in operation S110.

The accelerator controller module 12-2 reads the accelerator information SI of the first application program 12-1 from the table 12-3 in response to the acceleration request signal ACC_REQ, and therefore, the accelerator controller module 12-2 detects or determines the default accelerator that can accelerate a function executed by the first application program 12-1 based on the accelerator information SI.

In response to the acceleration request signal ACC_REQ, the accelerator controller module 12-2 compares a current usage (workload) of the CPU 12 with a reference usage (workload) and generates a comparison signal according to a comparison result in operation S112. The comparison signal may be used as a signal (e.g., ACC_CTR) for switching between heterogeneous accelerators (i.e., the hardware accelerator 18 and the software accelerator 12-4).

According to the comparison signal, the accelerator controller module 12-2 may switch the default accelerator (e.g., the hardware accelerator ACChw) set as default for the first application program 12-1 with a non-default accelerator (e.g., the software accelerator ACCsw) for the first application program 12-1 in operation S114 and drive the non-default accelerator in operation S116. Accordingly, the non-default accelerator accelerates a function or the processing of multimedia data corresponding to the first application program 12-1.

In another embodiment, when the third application program APP3 is executed, the accelerator controller module 12-2 receives an acceleration request signal generated by the third application program APP3 in operation S110.

In response to the acceleration request signal, the accelerator controller module 12-2 reads the accelerator information SI of the third application program APP3 from the table 12-3, and therefore, the accelerator controller module 12-2 detects or determines the default accelerator that can accelerate a function executed by the third application program APP3 based on the accelerator information SI.

In response to the acceleration request signal, the accelerator controller module 12-2 compares a current usage (workload) of the CPU 12 with a reference usage (workload) in operation S112. According to a comparison result, the accelerator controller module 12-2 switches the default accelerator (e.g., the software accelerator ACCsw) set as default for the third application program APP3 with a non-default accelerator (e.g., the hardware accelerator ACChw) for the third application program APP3 in operation S114 and drives the non-default accelerator in operation S116. Accordingly, the non-default accelerator accelerates the function corresponding to the third application program APP3. In other words, the accelerator controller module 12-2 compares the accelerators 18 and 12-4 with each other in performance and switches between the heterogeneous accelerators 18 and 12-4 based on the comparison result in operation S114.

The current usage and the reference usage may be an idle time of the CPU 12 or may be at least one among the operating voltage of the CPU 12 and the operating frequency of the CPU 12.

Figure 7:
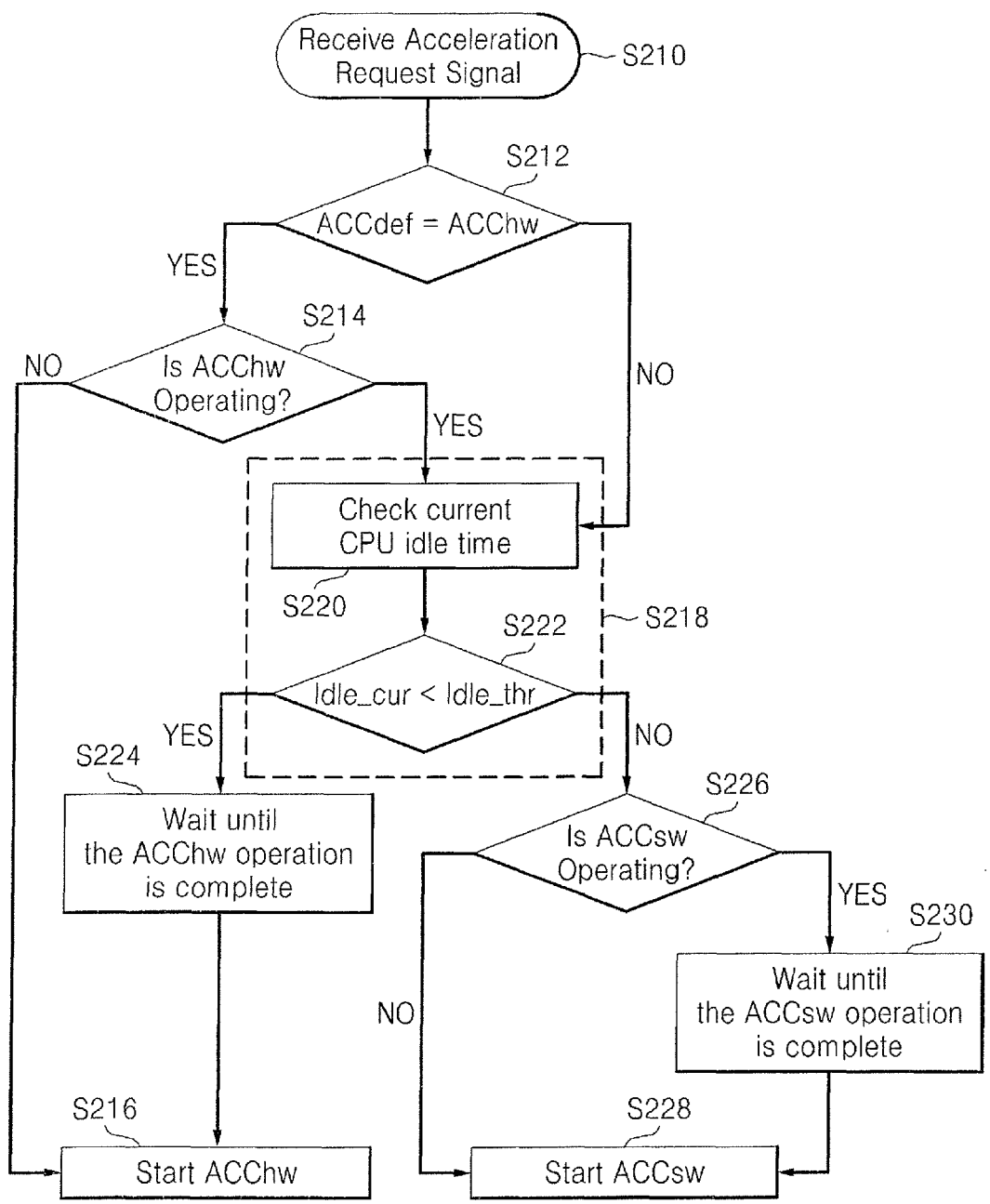
FIG. 7 is a flowchart of an operation method of the data processing system illustrated in FIG. 1 according to an exemplary embodiment of the present inventive concept.

The operation method illustrated in FIG. 6 will be described in detail with reference to FIGS. 7 and 8. FIG. 7 is a flowchart of an operation method of the data processing system 1 illustrated in FIG. 1 according to an exemplary embodiment of the present inventive concept. As described above, the default accelerator ACCdef is the accelerator that has been decided based on a result of comparing power consumption of a hardware accelerator with power consumption of a software accelerator.

Referring to FIGS. 1, 2 and 7, when the accelerator controller module 12-2 receives the acceleration request signal ACC_REQ generated by a requestor, e.g., the first application program 12-1 in operation S210, the accelerator controller module 12-2 detects whether the default accelerator ACCdef for accelerating a function executed by the first application program 12-1 is a hardware accelerator ACChw (i.e., the hardware accelerator 18) or a software accelerator ACCsw (i.e., the software accelerator 12-4) based on the accelerator information SI stored in the table 12-3 in operation S212.

When the default accelerator ACCdef is the hardware accelerator ACChw, the accelerator controller module 12-2 determines a current state of the hardware accelerator ACChw, that is, whether the hardware accelerator ACChw is accelerating other functions in operation S214. For example, the hardware accelerator ACChw could be currently accelerating a function (e.g., a function for rendering graphics, web-browsing, etc.) for another application program.

When the hardware accelerator ACChw is not operating at the moment, the accelerator controller module 12-2 drives the hardware accelerator ACChw using the hardware accelerator driver 12-5 in operation S216. However, if the hardware accelerator ACChw is operating at present, that is, when the hardware accelerator ACChw is accelerating a function corresponding to a different application program, the accelerator controller module 12-2 judges a current usage of the CPU 12 and determines whether to use the hardware accelerator ACChw or the software accelerator ACCsw according to a judging result in operation S218.

In an exemplary embodiment, the accelerator controller module 12-2 checks or calculates a current idle time Idle_cur corresponding to the current usage of the CPU 12 in operation S220. When the idle time decreases, a load on the CPU 12 increases.

The accelerator controller module 12-2 compares the current idle time Idle_cur with a threshold (or reference) idle time Idle_thr corresponding to a reference usage in operation S222.

When the current idle time Idle_cur is less than the threshold idle time Idle_thr, the accelerator controller module 12-2 waits for the operation of the hardware accelerator ACChw to complete in operation S224 and then executes the hardware accelerator driver 12-5. In other words, the accelerator controller module 12-2 does not select the software accelerator ACCsw but selects the hardware accelerator ACChw to avoid overload on the CPU 12. Accordingly, the hardware accelerator driver 12-5 starts the hardware accelerator ACChw to accelerate a function corresponding to the first application program 12-1 in operation S216.

However, when the current idle time Idle_cur is not less than the threshold idle time Idle_thr in operation S222, the accelerator controller module 12-2 determines whether the software accelerator ACCsw is currently operating in operation S226.

When it is determined that the software accelerator ACCsw is not operating at present, the accelerator controller module 12-2 starts the software accelerator ACCsw in operation S228. However, when it is determined that the software accelerator ACCsw is operating at present, that is, when the software accelerator ACCsw is accelerating a function corresponding to a different application program, the accelerator controller module 12-2 waits for the software accelerator ACCsw to complete the current operation in operation S230. Thereafter, according to the control ACC_CTR of the accelerator controller module 12-2, the software accelerator ACCsw accelerates the function corresponding to the first application program 12-1 in operation S228.

Figure 8:
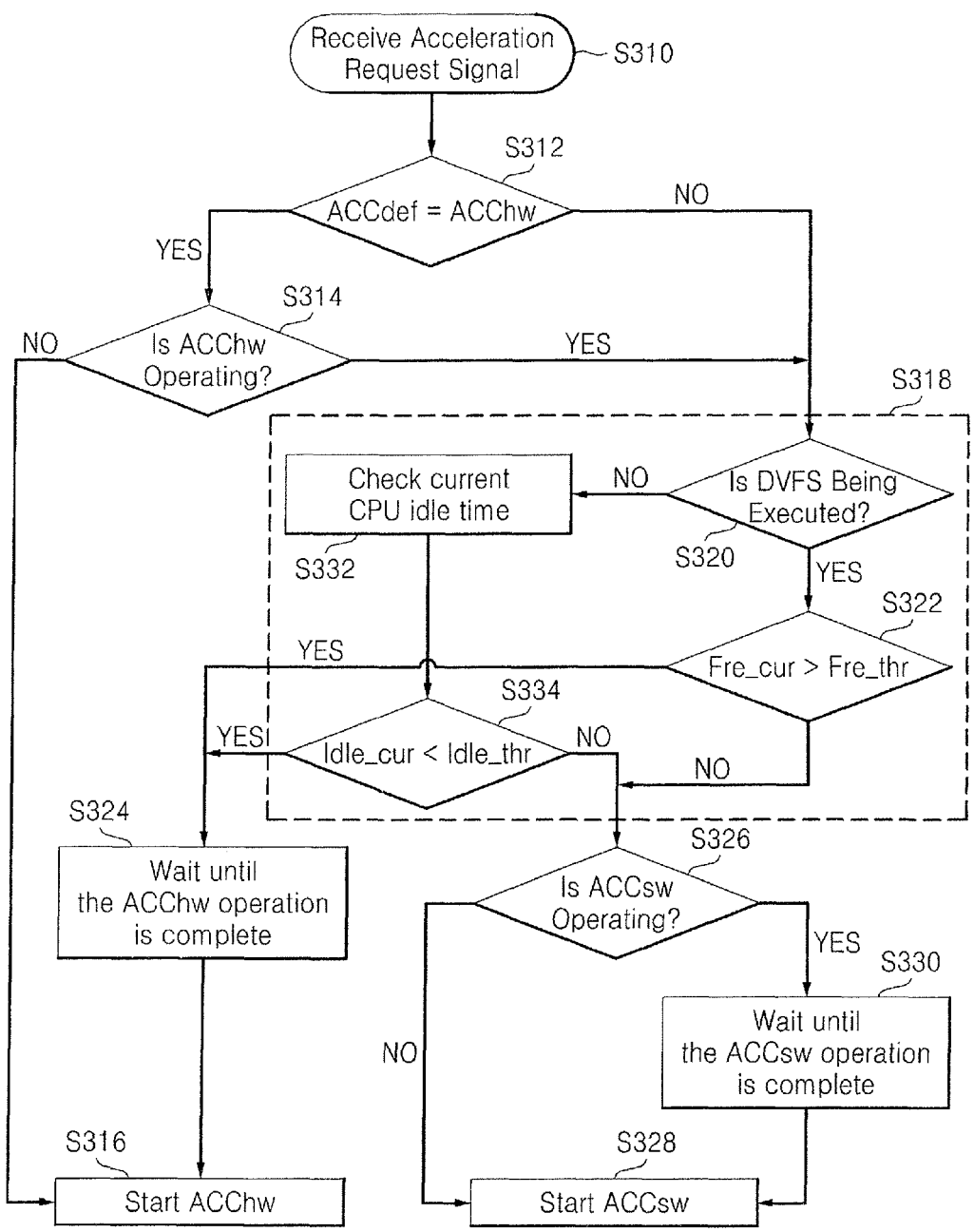
FIG. 8 is a flowchart of an operation method of the data processing system illustrated in FIG. 1 according to an exemplary embodiment of the present inventive concept.

FIG. 8 is a flowchart of an operation method of the data processing system 1 illustrated in FIG. 1 according to an exemplary embodiment of the present inventive concept. As described above, the default accelerator ACCdef is the accelerator that has been decided according to a result of comparing power consumption of a hardware accelerator with power consumption of a software accelerator. Referring to FIGS. 1, 2 and 8, when power (or voltage) is supplied to the SoC 10, a dynamic voltage and frequency scaling (DVFS) program 12-6 that has been stored in the memory 14 or 21 is loaded to the RAM 16 and then to the memory of the CPU 12. The DVFS program 12-6 may control or determine an operating voltage and an operating frequency of the CPU 12, taking a load (or workload) on the CPU 12 into account.

When the accelerator controller module 12-2 receives the acceleration request signal ACC_REQ generated by a requestor, e.g., the first application program 12-1 in operation S310, the accelerator controller module 12-2 detects or determines whether the default accelerator ACCdef for the first application program 12-1 is a hardware accelerator ACChw (i.e., the hardware accelerator 18) or a software accelerator ACCsw (i.e., the software accelerator 12-4) based on the accelerator information SI stored in the table 12-3 in operation S312.

When the default accelerator ACCdef is the hardware accelerator ACChw 18, the accelerator controller module 12-2 determines a current state of the hardware accelerator ACChw, that is, whether the hardware accelerator ACChw 18 is currently operating in operation S314.

When the hardware accelerator ACChw 18 is not operating at the moment, the accelerator controller module 12-2 drives the hardware accelerator ACChw 18 using the hardware accelerator driver 12-5 in operation S316.

However, when the hardware accelerator ACChw 18 is operating at present, that is, when the hardware accelerator ACChw 18 is processing a function corresponding to a different application program, the accelerator controller module 12-2 determines whether to use the hardware accelerator ACChw or the software accelerator ACCsw based on a result of comparing a current usage of the CPU 12 with a reference usage in operation S318.

The reference usage may be predetermined and stored in the memory 14 or 21 in advance. In addition, the accelerator controller module 12-2 may adjust the reference usage based on information input through a user input interface (not shown) that the accelerator controller module 12-2 can communicate with through the bus 22.

In an exemplary embodiment, the accelerator controller module 12-2 determines whether the DVFS program 12-6 is being executed in operation S320. When it is determined that the DVFS program 12-6 is being executed, the accelerator controller module 12-2 obtains information about a current operating voltage of the CPU 12 and information about a current operating frequency of the CPU 12 from the DVFS program 12-6 and checks a load on the CPU 12.

The accelerator controller module 12-2 compares an operating frequency Fre_cur corresponding to a current usage of the CPU 12 with a threshold frequency Fre_thr corresponding to the reference usage and outputs a comparison signal in operation S322.

When the operating frequency Fre_cur is greater than the threshold frequency Fre_thr in operation S322, the accelerator controller module 12-2 waits for the operation of the hardware accelerator ACChw to complete in response to the comparison signal in operation S324 and then executes the hardware accelerator driver 12-5. In other words, the accelerator controller module 12-2 does not select the software accelerator ACCsw but selects the hardware accelerator ACChw to reduce overload on the CPU 12.

Accordingly, the hardware accelerator driver 12-5 drives the hardware accelerator ACChw to accelerate multimedia corresponding to the first application program 12-1 in operation S316.

However, when the operating frequency Fre_cur is not greater than the threshold frequency Fre_thr in operation S322, in response to the comparison signal, the accelerator controller module 12-2 determines a current state of the software accelerator ACCsw, that is, whether the software accelerator ACCsw is currently operating in operation S326.

When it is determined that the software accelerator ACCsw is not operating at present, the accelerator controller module 12-2 starts or executes the software accelerator ACCsw in operation S328. However, when it is determined that the software accelerator ACCsw is operating at present, that is, when the software accelerator ACCsw is processing multimedia corresponding to a different application program, the accelerator controller module 12-2 waits for the software accelerator ACCsw to complete the current operation in operation S330. Thereafter, according to the control (or control signal) ACC_CTR of the accelerator controller module 12-2, the software accelerator ACCsw accelerates the function corresponding to the first application program 12-1 in operation S328.

When it is determined that the DVFS program 12-6 is not being executed in operation S320, the accelerator controller module 12-2 checks a current idle time Idle_cur of the CPU 12 in operation S332. When the idle time decreases, the load on the CPU 12 increases.

The accelerator controller module 12-2 compares the current idle time Idle_cur corresponding to a current usage of the CPU 12 with a threshold idle time Idle_thr corresponding to the reference usage in operation S334.

When the current idle time Idle_cur is less than the threshold idle time Idle_thr in operation S334, the accelerator controller module 12-2 waits for the operation of the hardware accelerator ACChw to complete in operation S324 and then executes the hardware accelerator driver 12-5. Accordingly, the hardware accelerator driver 12-5 starts or drives the hardware accelerator ACChw to accelerate the function corresponding to the first application program 12-1 in operation S316.

However, when the current idle time Idle_cur is not less than the threshold idle time Idle_thr in operation S334, the accelerator controller module 12-2 determines whether the software accelerator ACCsw is currently operating in operation S326.

When it is determined that the software accelerator ACCsw is not operating at present, the accelerator controller module 12-2 starts or executes the software accelerator ACCsw in operation S328. However, when it is determined that the software accelerator ACCsw is operating at present, that is, when the software accelerator ACCsw is processing a function corresponding to a different application program, the accelerator controller module 12-2 waits for the software accelerator ACCsw to complete the current operation in operation S330. Thereafter, the software accelerator ACCsw is started according to the control ACC_CTR of the accelerator controller module 12-2 in operation S328 to accelerate the function corresponding to the first application program 12-1.

As described above, the accelerator controller module 12-2 may switch a default accelerator that has been set for each application program based on power consumption between heterogeneous accelerators dynamically and/or in real time based on a current state of the default accelerator and a current usage of the CPU 12.

In other words, the accelerator controller module 12-2 may select one of heterogeneous accelerators as a default accelerator based on power consumption as a factor that determines the quality of the data processing system 1 or the SoC 10, then compare performance of the default accelerator with performance of a non-default accelerator, and then switch or change from the default accelerator to the non-default accelerator according to a comparison result.

For instance, when an MP3 player and a video player operate during a given time, multi-acceleration can be performed, that is, an MP3 decoder accelerator for the MP3 player and another MP3 decoder accelerator for the play of audio at the execution of the video player can be simultaneously driven.

Figure 9:
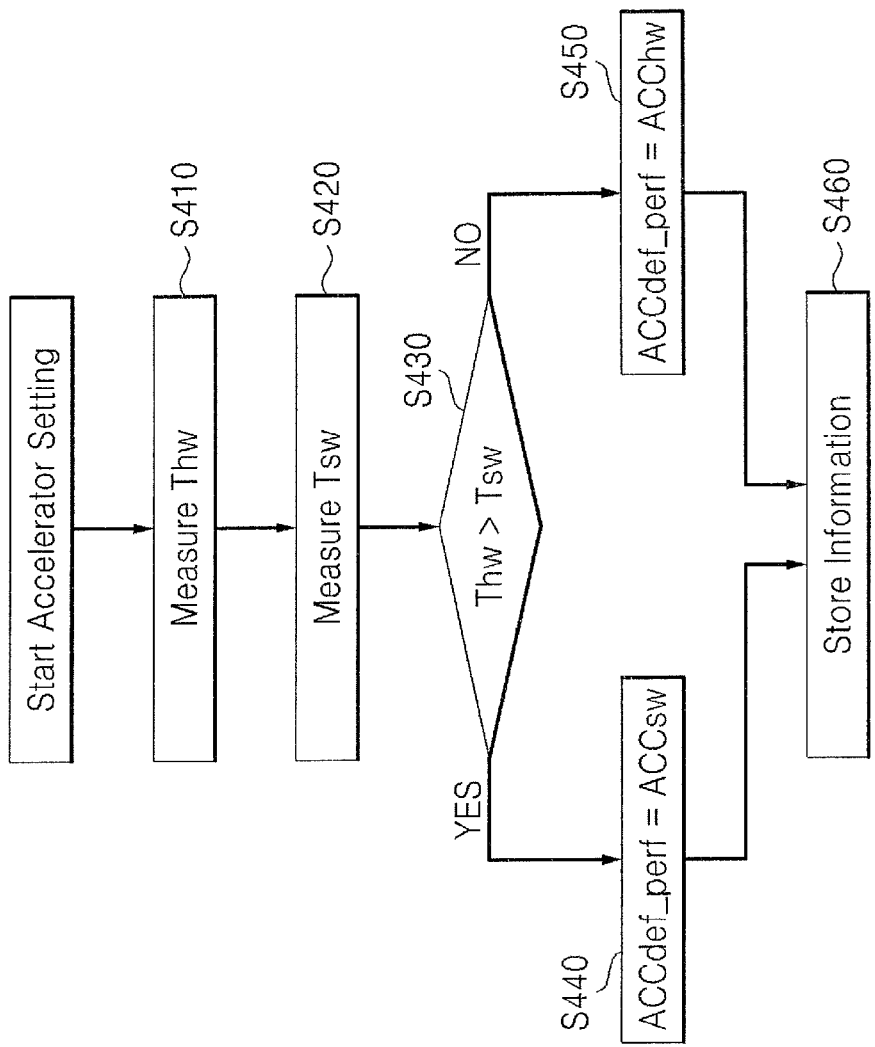
FIG. 9 is a flowchart of a method of selecting a default accelerator for an application program based on performance according to an exemplary embodiment of the present inventive concept.

FIG. 9 is a flowchart of a method of selecting a default accelerator for an application program based on performance according to exemplary embodiment of the present inventive concept. In the method illustrated in FIG. 9, a default accelerator is determined based on a result of comparing performance of a hardware accelerator with performance of a software accelerator.

Referring to FIGS. 1, 2 and 9, when accelerator setting starts, the accelerator controller module 12-2 loaded to the CPU 12 measures (or estimates) an acceleration time Thw needed for a hardware accelerator ACChw allocated for an application program to carry out acceleration in operation S410.

The accelerator controller module 12-2 also measures (or estimates) an acceleration time Tsw needed for a software accelerator ACCsw allocated for the application program to carry out acceleration in operation S420. In the embodiment illustrated in FIG. 9, operation S410 is performed before operation S420, but operation S420 may be performed before operation S410 in other embodiments.

For example, if a software accelerator ACCsw had previously taken 1 second and then 2 seconds to accelerate the rendering of two different images, the acceleration time Tsw could be estimated at 1.5 seconds. The computer system in which the accelerators are run may record run periods of the software and/or hardware accelerator for each application program. The accelerator controller module 12-2 may be configured to access this historical data to estimate the acceleration times. However, the computation of the acceleration times is not limited thereto, as various other methods may be used for measuring or estimating the acceleration times.

The accelerator controller module 12-2 compares the acceleration time Thw of the hardware accelerator ACChw with the acceleration time Tsw of the software accelerator ACCsw in operation S430. For instance, when the acceleration time Thw of the hardware accelerator ACChw is longer than the acceleration time Tsw of the software accelerator ACCsw, the accelerator controller module 12-2 selects the software accelerator ACCsw for the application program as a default accelerator ACCdef_perf in operation S440.

However, when the acceleration time Thw of the hardware accelerator ACChw is not longer than the acceleration time Tsw of the software accelerator ACCsw, the accelerator controller module 12-2 selects the hardware accelerator ACChw for the application program as the default accelerator ACCdef_perf in operation S450. In other words, the accelerator controller module 12-2 selects as a default accelerator for an application program, an accelerator having a shorter acceleration time between a software accelerator and a hardware accelerator.

The accelerator controller module 12-2 stores information about the accelerator selected in operation S440 or S450 in a table in operation S460. For instance, the table may be the table 12-3 or a different one. The table may be stored in the memory 14 or 21, then loaded to the RAM 16, and then loaded to the CPU 12.

For example, when the SoC 10 illustrated in FIG. 1 includes "n" ("n" is a natural number) application programs, "n" hardware accelerators and "n" software accelerators, the accelerator controller module 12-2 may select a default accelerator for each of the "n" application programs based on performance (e.g., an acceleration time) and store information about the selected accelerator in the table the same as or different from the table 12-3.

Accordingly, even when a hardware accelerator has been set as a default accelerator for the first application program APP1 based on power consumption, the default accelerator for the first application program APP1 may be changed to a software accelerator based on performance.

Figure 10:
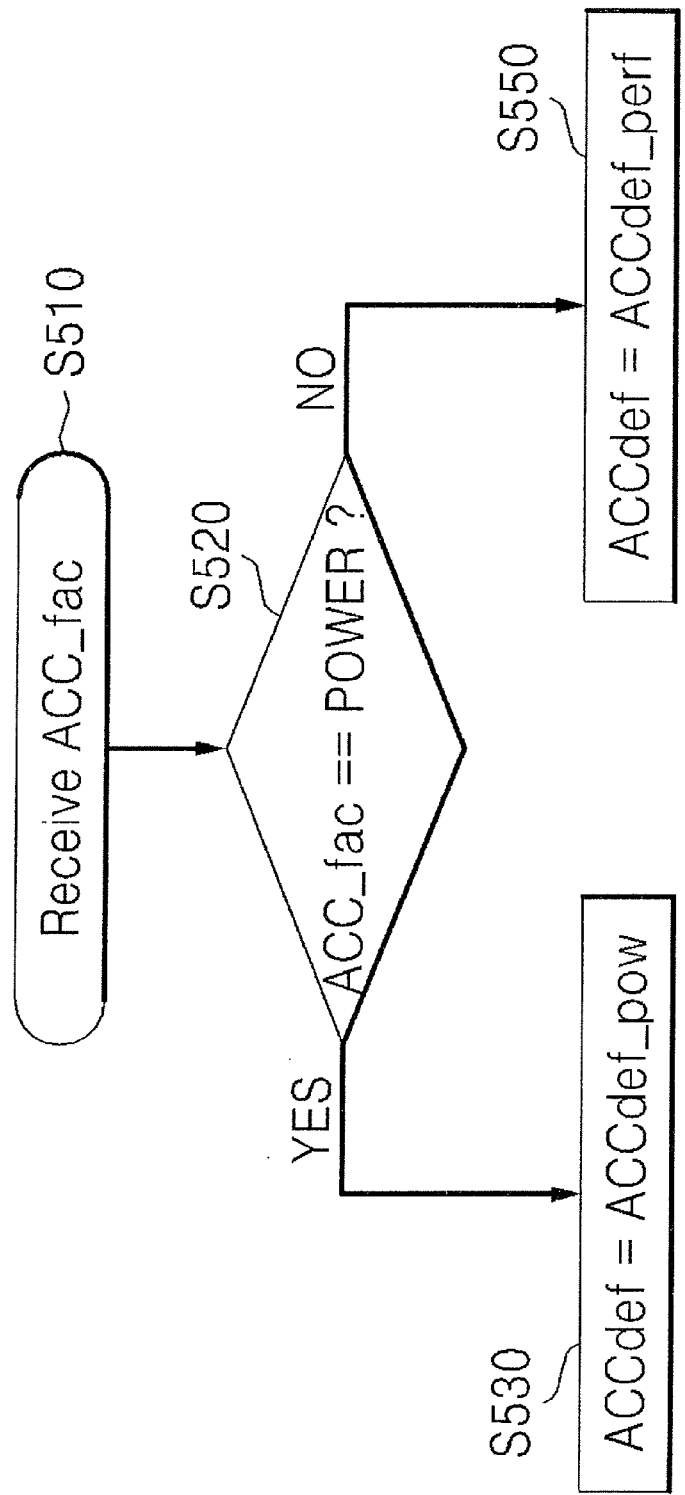
FIG. 10 is a flowchart of an operation method of the data processing system illustrated in FIG. 1 according to an exemplary embodiment of the present inventive concept.

FIG. 10 is a flowchart of an operation method of the data processing system 1 illustrated in FIG. 1 according to an exemplary embodiment of the present inventive concept. Referring to FIGS. 1 through 10, the accelerator controller module 12-2 may select the default accelerator set based on the power consumption in FIG. 4 or the default accelerator set based on the performance in FIG. 9 according to a program or a user's request signal.

For instance, the accelerator controller module 12-2 receives a change signal ACC_fac in operation S510. The change signal ACC_fac may be a signal input through a user interface or a signal output from the CPU 12.

The accelerator controller module 12-2 determines whether a default accelerator has been set based on the power consumption or the performance in response to the change signal ACC_fac in operation S520.

Information about whether the default accelerator is set based on the power consumption or the performance may be stored in the memory 14 or 21. Accordingly, when the data processing system 1 is booted or an application program is executed, the accelerator controller module 12-2 may determine whether the default accelerator for the application program has been set based on the power consumption or the performance with reference to the information stored in the memory 14 or 21 in operation S520.

For example, when the change signal ACC_fac is an instruction to select the default accelerator set based on the power consumption in operation S520, the accelerator controller module 12-2 selects a default accelerator ACCdef_pow set based on the power consumption referring to a table.

However, when the change signal ACC_fac is an instruction to select the default accelerator set based on the performance in operation S520, the accelerator controller module 12-2 selects a default accelerator ACCdef_perf set based on the performance referring to the table.

As described with reference to FIG. 7 or 8, the default accelerator ACCdef_pow or ACCdef_perf may be switched with a non-default accelerator.

According to an exemplary embodiment of the present inventive concepts, the accelerator controller module 12-2 may perform operations such as i) selecting the default accelerator ACCdef_pow based on power consumption, ii) selecting the default accelerator ACCdef_perf based on performance, iii) switching (or changing) the default accelerator ACCdef_pow selected based on the power consumption, and iv) switching (or changing) the default accelerator ACCdef_perf selected based on the performance. For example, the module 12-2 can switch between using a hardware accelerator and a software accelerator according to the performance of the hardware accelerator and the performance of the software accelerator, and the module 12-12 can switch between using a hardware accelerator and a software accelerator according to the power consumption of the hardware accelerator and the power consumption of the software accelerator.

When the CPU 12 is a multi-core processor including a plurality of independent cores, a method of selecting between a hardware accelerator and a software accelerator for each of the cores as a default accelerator may be determined by the power consumption or the performance of each core, as described above. In this example, the accelerator controller module 12-2 may perform the above-described four operations.

As described above, in at least one embodiment of the inventive concept, a method and a SoC performing the method switches between heterogeneous accelerators to accelerate multimedia executed by an application program using an accelerator controller module. The switching is carried out based on power consumption and/or performance in the SoC including the heterogeneous accelerators, thereby reducing the power consumption of the SoC and increasing the performance thereof. In addition, the SoC performs may drive multiple heterogeneous accelerators at a time (multi-acceleration driving), thereby increasing the acceleration performance.

While the present inventive concept has been particularly shown and described with reference to exemplary embodiments thereof, it will be understood by those of ordinary skill in the art that various changes in forms and details may be made therein without departing from the spirit and scope of the disclosure.

What is claimed is:

1. A method for operating a system-on-chip (SoC), the method comprising:
    loading a table to a memory of a central processing unit (CPU) of the SoC, the table comprising information indicating a default accelerator assigned to an application program;
    receiving an acceleration request signal generated upon execution of the application program;
    in response to receipt of the acceleration request signal, comparing a parameter of the CPU during a current usage of the CPU with a threshold value to generate a comparison signal; and
    performing switching between a software accelerator and a hardware accelerator among a plurality of heterogeneous accelerators based on the comparison signal and the loaded information indicating the default accelerator assigned to the application program, to accelerate a function executed by the application program.

2. The method of claim 1, wherein the hardware accelerator is implemented as a hardware device and the software accelerator is implemented as program code configured to be executed by the CPU, and the software accelerator is loaded from a memory to the CPU and then executed.

3. The method of claim 2, wherein the comparing occurs when a default accelerator for the application program is the hardware accelerator and the hardware accelerator is currently operating.

4. The method of claim 2, wherein the comparing occurs when a default accelerator for the application program is the software accelerator.

5. The method of claim 1, wherein the parameter is an idle time of the CPU.

6. The method of claim 1, wherein the parameter is one of an operating voltage of the CPU and an operating frequency of the CPU.

7. A method for operating a system-on-chip, the method comprising:
    receiving an acceleration request signal generated upon execution of an application program;
    determining whether a default accelerator for accelerating a function executed by the application program is a hardware accelerator or a software accelerator in response to the acceleration request signal, wherein the software accelerator is implemented as a computer program that is configured to be executed by a central processing unit (CPU);
    comparing a current usage of the CPU with a threshold value to generate a comparison signal when it is determined that the default accelerator is the software accelerator or is the hardware accelerator that is currently accelerating a different function; and
    switching the default accelerator with a non-default accelerator according to the comparison signal.

8. The method of claim 7, wherein the determining is performed based on accelerator information stored in a table.

9. A system-on-chip (SoC) comprising:
    heterogeneous accelerators; and
    a central processing unit (CPU) configured to execute an accelerator controller module which generates a comparison signal and refers to information in a table loaded into a memory of the CPU indicating a default accelerator assigned to an application program for switching between a hardware accelerator and a software accelerator among the heterogeneous accelerators for acceleration of a function executed by the application program, wherein the accelerator controller module compares a parameter of the CPU during a current usage of the CPU with a threshold value to output the comparison signal, wherein the hardware accelerator is implemented as a hardware device and the software accelerator is implemented as a computer program code that is configured to be executed by the CPU, wherein the software accelerator is loaded from a memory to the CPU and then executed.

10. The SoC of claim 9, wherein when the hardware accelerator is set as the default accelerator for accelerating the function and is currently accelerating a different function, the accelerator controller module switches the hardware accelerator with the software accelerator to accelerate the function based on the comparison signal generated when an idle time of the CPU that corresponds to the current usage is greater than the threshold value.

11. The SoC of claim 9, wherein when the software accelerator is set as the default accelerator for accelerating the function, the accelerator controller module switches the software accelerator with the hardware accelerator to accelerate the function based on the comparison signal generated when an idle time of the CPU that corresponds to the current usage is less than the threshold value.

12. The SoC of claim 9, wherein when the hardware accelerator is set as the default accelerator for accelerating the function and is currently accelerating a different function, the accelerator controller module switches the hardware accelerator with the software accelerator to accelerate the function based on the comparison signal generated when an operating frequency of the CPU that corresponds to the current usage is lower than the threshold value.

13. The SoC of claim 9, wherein when the software accelerator is set as the default accelerator for accelerating the function, the accelerator controller module switches the software accelerator with the hardware accelerator to accelerate the function based on the comparison signal generated when an operating frequency of the CPU that corresponds to the current usage is higher than the threshold value.

14. The SoC of claim 9, wherein the parameter is an idle time of the CPU.

15. The SoC claim 9, wherein the parameter is one of an operating voltage of the CPU and an operating frequency of the CPU.

16. A system-on-chip (SoC) comprising:
a hardware accelerator;
a memory configured to store an application program, an accelerator controller module and a software accelerator; and
a central processing unit (CPU) configured to control the hardware accelerator and the memory, and execute the application program, the accelerator controller module, and the software accelerator,
wherein upon receipt by the accelerator controller module of an acceleration request signal generated by the application program, the accelerator determines whether a default accelerator for accelerating a function executed by the application program is the hardware accelerator or the software accelerator in response to the acceleration request signal,
wherein the accelerator controller module compares a current usage of the CPU with a threshold value to generate a comparison signal when it is determined that the default accelerator is the software accelerator or is the hardware accelerator that is currently accelerating a different function, and
wherein the accelerator controller module switches the default accelerator with a non-default accelerator according to the comparison signal.

17. The SoC of claim 16, wherein the accelerator controller module is stored in the memory and determines the default accelerator based on accelerator information about the default accelerator.

18. The SoC of claim 16, wherein the accelerator controller module adjusts the threshold value according to information input from a user input interface.

* * * * *